Nov. 4, 1969   G. BELL ET AL   3,476,666
CENTRIFUGALLY OPERATING ELECTRODEPOSITION
APPARATUS AND METHOD OF USE
Filed Feb. 8, 1966   7 Sheets-Sheet 1

Inventors
George Bell &
Anthony James O'Connell
By
Mason, Porter, Diller & Brown
Attorneys Nov. 4, 1969     G. BELL ET AL     3,476,666
CENTRIFUGALLY OPERATING ELECTRODEPOSITION
APPARATUS AND METHOD OF USE Filed Feb. 8, 1966     7 Sheets-Sheet 2

Inventors
George Bell &
Anthony James O'Connell
By
Mason, Porter, Diller & Brown
Attorneys

Fig. 4B.

Inventors
George Bell &
Anthony James O'Connell
By
Mason, Porter, Diller & Brown
Attorneys

# United States Patent Office 3,476,666
Patented Nov. 4, 1969

3,476,666
CENTRIFUGALLY OPERATING ELECTRODEPOSITION APPARATUS AND METHOD OF USE
George Bell, Radlett, and Anthony James O'Connell, South Harrow, England, assignors to The Metal Box Company Limited, London, England, a British company
Filed Feb. 8, 1966, Ser. No. 535,637
Claims priority, application Great Britain, Feb. 9, 1965, 5,634/65
Int. Cl. C23b 13/00; B01k 5/02
U.S. Cl. 204—181                         27 Claims

ABSTRACT OF THE DISCLOSURE

Methods and apparatus for coating, by electro-deposition, exposed interior surfaces of can bodies by positioning a plurality of can bodies in surrounding relation to a plurality of electrodes, rotating the plurality of can bodies and electrodes about an axis to centrifugally retain electrolyte between each can body-electrode pair and applying a potential between the electrodes and can bodies to effect electro-deposition of coating material upon the exposed interior surfaces. Preferably, a plurality of arms are employed extending outwardly from the axis of rotation, each of which supports a turret movable toward and away from the axis of rotation and rotatable about the associated arm for moving a plurality of can bodies supported thereby to and from a plurality of stations on each of the arms, one of the stations including the electrode employed in electro-deposition and further ones of the stations being employed in rinsing of the coated can bodies.

---

This invention relates to coating articles and in particular to coating electrically conducting surface areas of articles by electro-deposition of organic film-forming materials from aqueous media.

As is well understood, can components such as can bodies and ends therefor have the interior surfaces thereof coated with lacquer when the cans are intended to contain beverages or some kinds of foods or preserves. A thin coating of lacquer is usually applied to the metal, which usually is tinplate, by a roller coating process, before it is shaped to form the components and during the shaping the lacquer is usually scratched or otherwise subjected to minor damage which exposes small areas of the metal thus rendering the cans liable to corrosion by the contents thereof. It has, hitherto, been usual to repair damage effected to the lacquer during component shaping by spraying the interior of each can with a further coating of lacquer. This process, however, is not only relatively slow as compared with the rate of can manufacture but is extremely wasteful of lacquer because not only is the lacquer sprayed on to the damaged lacquer areas but it is also sprayed on those areas which are undamaged and which consequently do not require further coating.

It is accordingly a main object of the present invention to provide a method of and apparatus for coating only damaged areas of can components at a rate which is comparable with that at which the components are produced.

As mentioned above, it is usual for the lacquer coating to be applied to the components before shaping thereof. It has, however, been proposed to effect coating by electro-deposition after the can bodies have been formed. Such proposals have, however, not been exploited commercially to any appreciable extent primarily because it has not been found possible to develop such a process and apparatus therefor that would be capable of keeping pace with the present day very high speeds of can manufacture, that is the production of cans at a rate of 600 or more cans per minute. The process and apparatus according to the present invention is capable of effecting electro-deposition of coating material on cans or can components at a rate in excess of 600 cans per minute, and this irrespective of whether deposition is effected merely to repair damaged pre-coatings or whether it is a complete coating applied to previously uncoated metal. Although the invention is primarily concerned with the electro-deposition of coating material on cans and can components it is also applicable to the coating, by electro-deposition, of other kinds of articles made from electrically conducting material.

According to the invention there is provided a method of applying a coating to electrically conducting surface areas of an article by disposing the article in close juxtaposition with the electrode of a cell centrifugally retaining a polymer-containing electrolyte between the article and the electrode and causing an electrical current to flow between the article and the electrode through the electrolyte by establishing an electrical potential between the article and the electrode and permitting the electrical current to flow until the electrically conducting surface areas of the article have been coated with polymer electro-deposited from the electrolyte. When the article is a can body having opposite open ends the method may include the step of engaging the can body at one end thereof and moving it axially into the cell to surround the electrode.

If the article is a can body having one open end the method may include the step of engaging the closed end of the body and moving the body axially open end first into the cell to surround the electrode.

According to one aspect of the invention the electrode is an anode and the electrolyte is cationic but it will be understood that the polarity of the article to be coated is determined by the ionic character of the organic film-forming material contained in the electrolyte.

The method may also include the steps of withdrawing the article from the electrolyte, rinsing the article in de-ionised water, and drying the article. Rinsing may be effected in two stages, first by the use of cold de-ionised water and second by the use of hot de-ionised water to improve coagulation of the electro-deposited coating. Further the method may include the step of stoving the electro-deposited coating.

The electrolyte may be an aqueous emulsion and the emulsion may be cationic emulsion based on a self-emulsifying epoxy-polyamide resin.

The invention also contemplates articles coated by the method.

Further according to the invention there is provided apparatus for applying a coating to electrically conductive surface areas of an article, comprising a rotatable carrier supporting for movement therewith at least one cell having an electrode mounted therein, means operable to deliver to the cell a quantity of a polymer-containing electrolyte, driving means operable to rotate the carrier continuously at a velocity such that the electrolyte contained in the cell is centrifugally retained therein, article-engaging means operable to move an article towards and away from said cell and to position the article relative to the cell in close juxtaposition with the electrode with electrolyte between the article and the electrode and means operable while the article is so positioned to cause an electrical current to flow between the article and the electrode through the electrolyte by establishing an electrical potential between the article and the electrode and to permit the electrical current to flow until the electrically conducting areas of the article are coated with polymer electro-deposited from the electrolyte.

In order that the invention may be clearly understood embodiments thereof will now be described, by way of example, with reference to the accompanying drawings in which:

FIGURE 10 is a top plan, to a reduced scale, of a part of FIGURE 9.

Figures 1, 2:
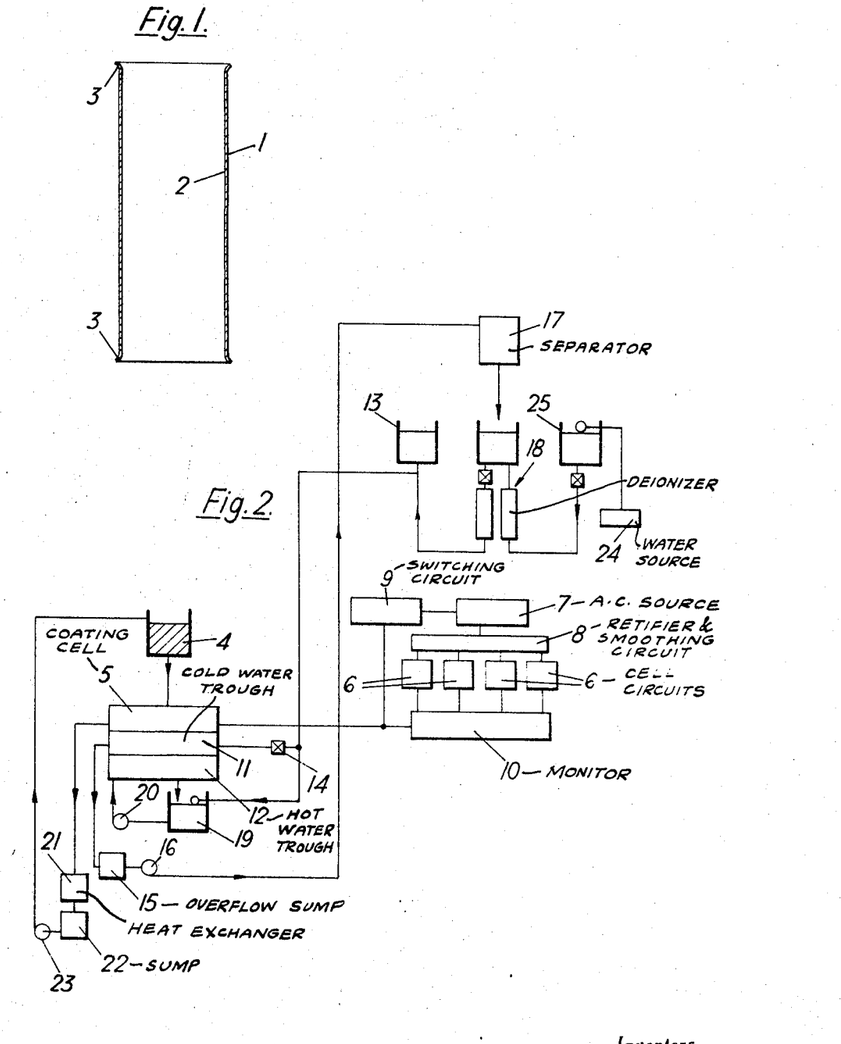
FIGURE 1 is a section through a can body.
FIGURE 2 is a flow diagram of the method according to the invention.

Bodies 1, FIGURE 1, for cans are usually made from tinplate sheets one side 2 of each of which, being the side which is to form the inner sides of the body, is precoated with lacquer. The bodies are made by known kinds of machine, forming no part of the present invention, at a rate of about 600 bodies per minute and each body consists of an open-ended tube the ends 3 of which are flanged outwards ready for seaming, in known manner, to can ends. The bodies so formed may be removed from the flanging machine and transferred to apparatus for carrying out the method according to the invention, or the bodies may be delivered from the flanging machine to said apparatus.

The method according to the invention will first be described with reference to FIGURE 2. The polymer-containing electrolyte is delivered from a storage tank 4, to a plurality, for example eight or ten, of cells each housing an electrode and is centrifugally retained in a cell during electro-deposition of polymer on a can body which is introduced into the cell to be in close juxtaposition with the electrode. The position of electro-deposition is indicated by the block 5 and the electric circuits of the cells are indicated by the blocks 6 each block representing alternate cells. To effect deposition an electrical current is caused to flow between the body and the electrode through the electrolyte by establishing a D.C. potential between the body and the electrode and permitting the electrical current to flow until the elecrically conducting surface areas of the body have been coated with polymer electro-deposited from the electrolyte. If desired a direct current generator may be used but as shown in the drawing potential from an A.C. source 7 is fed to a rectifying and smoothing device 8 from which the D.C. potential passes to the electric circuits of the cells 6. A time-controlled switching unit 9 is operable to cause current to flow when a body is fully immersed in the electrolyte in a cell. The D.C. requirement of each cell is controlled up to one kilo-volt at one ampere and consecutive cells are fed from separate circuits to allow deposition of polymer on each body followed by observations by a monitor 10 the observations of which can be employed to effect rejection of bodies which are inadequately treated by the deposition process. When carrying the method into effect the voltage applied across a cell is controlled below the value at which dielectric breakdown of the deposited film occurs. The current flowing is dependent upon the exposed metal area of the pre-lacquered body and, although at the start of a deposition operation the current density may be of the order of 50 to 100 amperes per square foot, it usually falls to about two thirds of this value by the time the current is switched off.

When the body is withdrawn from the cell, or a trough as described below, at the completion of the process carried out therein, the liquid drains from the body under the action of centrifugal force. The acceleration of the liquid held in the body can be made much greater than that it would experience by gravity alone in a non-rotating machine, by appropriate selection of the radius of rotation and of the angular velocity.

After withdrawal of a body from a cell the body is rinsed in de-ionised water. As indicated in the drawing rinsing is effected in two stages by first moving the body into a water trough 11 and then into a water trough 12. The troughs 11, 12, may each receive cold de-ionised water or, as described below, trough 11 may receive cold de-ionised water and trough 12 may receive hot de-ionised water.

The cold water trough 11 receives de-ionised water from a storage tank 13, through valve 14, and overflow from the trough 11 passes to a sump 15 from which a pump 16 feeds the overflow to an electro-separator 17 which removes trace lacquer from the water before the water is returned to a de-ioniser unit 18.

The de-ionised water for the hot rinse is delivered to a sump 19 in which it is heated and the heated water is fed by a pump 20 to the trough 12. Overflow from trough 12 is returned to sump 19.

Electrolyte emptied from the cells 5 can be returned to the storage tank 4 via a heat exchanger 21, a sump 22, and a pump 23.

The de-ionised water is delivered from a storage tank 13 which receives the water from an ion-exchange unit 18 fed with mains water from a source 24 via a tank 25.

Following rinsing, the bodies are placed in a heated oven in which they are dried and the electro-deposited coating is stoved.

Figure 3:
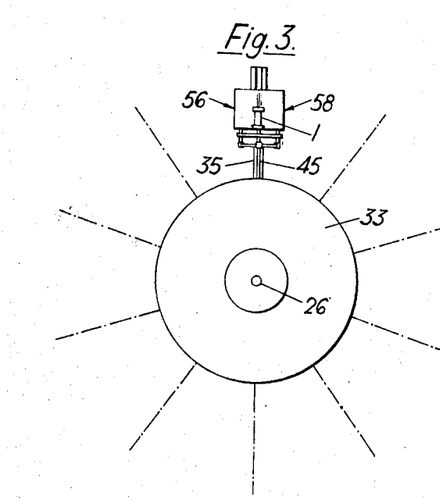
FIGURE 3 is a diagrammatic front elevation of a machine for carrying the method into effect, FIGURES 4A and 4B together are a longitudinal elevation, partly in section, of one arm of the machine shown in FIGURE 3.

Referring to FIGURES 3 to 8, one embodiment of apparatus for carrying out the method described above comprises a stationary shaft 26, FIGURES 3 and 4B, having a horizontal axis, and a four-stop screw-type indexing cam 27 is keyed to the shaft 26. Four equi-spaced pairs of rollers 28, only one pair of which is shown in the drawings, rotatable with a bevel gear wheel 29 are arranged to co-operate with the screw-type cam 27. The bevel gear wheel 29 meshes with a bevel gear 30 pinned to a splined shaft 31 rotatable in bearings 32 carried by an arm 33 which also supports the bevel gear 29. The arm 33 is part of a circular housing joining ten arms into a unit, and the housing comprises a part of a casing which encloses the working parts. The other part of the casing is shown at 33a, FIG. 4B and the casing rotates on bearings 33b, FIG. 4B. The arm 33 is continuously rotatable about the stationary shaft 26, by any suitable means, not shown. During rotation of arm 33 about shaft 26 the pairs of rollers 28 are successively displaced by the screw-type cam 27 so that the splined shaft 31 is indexed about its longitudinal axis. As shown in FIGURE 3 the apparatus has ten arms 33 but as the construction and mode of operation of the apparatus carried by the arms is identical only one arm and the apparatus associated therewith will be described in detail.

Figure 4A:
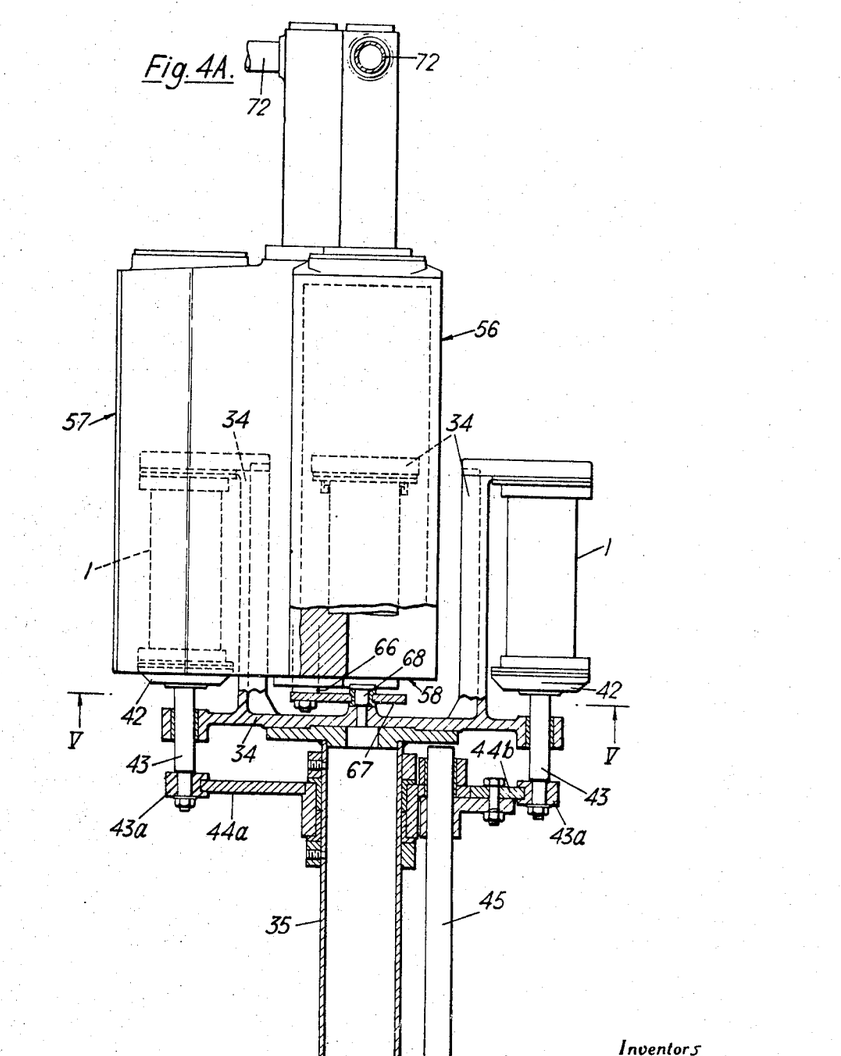
Figure 4B:
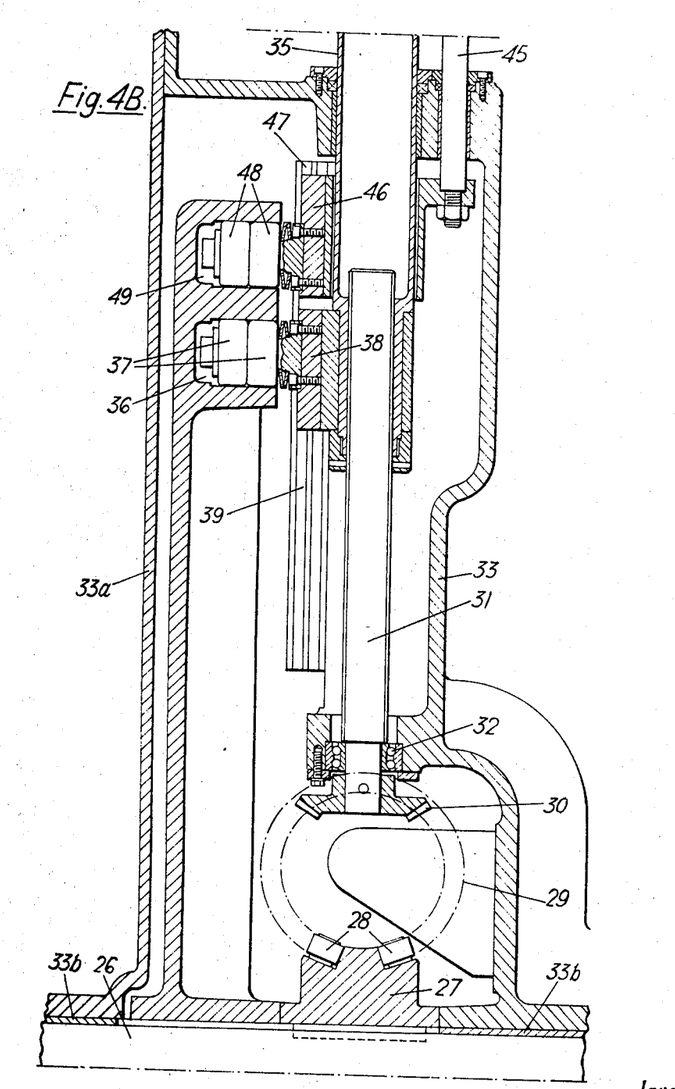

The arm 33 acts as a carrier for a turret 34, FIGURE 4A, which is mounted on a hollow shaft 35 rotatable with and slidable axially on the splined shaft 31. Axial reciprocation of the hollow shaft 35 is controlled by a cam 36, FIG. 4B, which is keyed to the stationary shaft 26 and which co-operates with rollers 37 carried by a slide 38 movable with the hollow shaft 35. The slide 38 slides lengthwise in fixed guides 39. Each turret supports four equi-spaced sets of can-gripping means arranged to receive and hold a can body 1 for axial movement thereof. Each set of gripper means is identical with the others and one set is illustrated in FIGURES 7 and 8.

Figure 7:
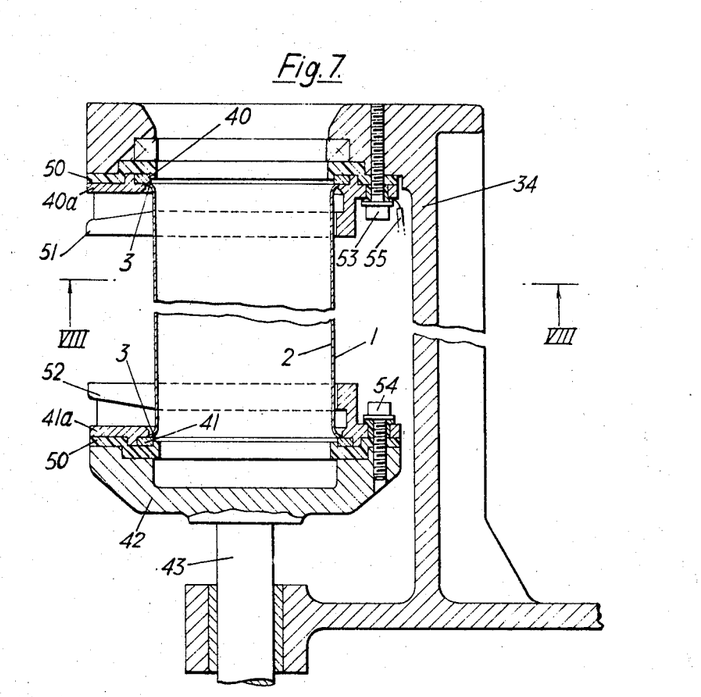
FIGURE 7 is a section through can gripper means carried by the turret.
Figure 8:
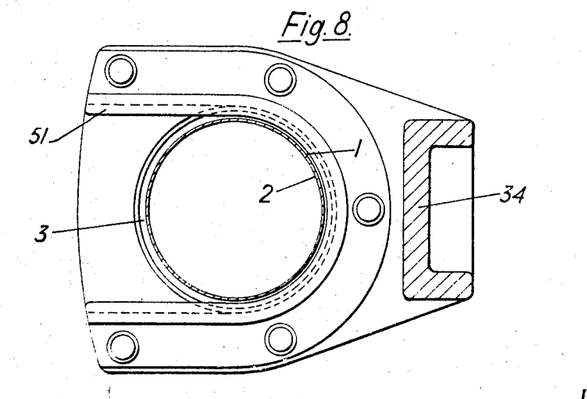
FIGURE 8 is a section on line VIII—VIII, FIGURE 7, FIGURE 9 diagrammatically illustrates an alternative form of apparatus according to the invention.

As shown in FIGURES 7 and 8, the gripper means comprises a pair of annular clamping elements 40, 41, made of rubber or similar material, of which the element 40 is fixed to the turret 34 and the element 41 is carried by a pad 42 having a stem 43 arranged to effect axial movement of element 41 relative to element 40 into and out of clamping relation therewith. The stem 43 is secured through a bearing 43a, FIG. 4A, to a circular support member consisting of two segments 44a, 44b. The circular support member is constrained by a sliding column, not shown, against rotation with the turret 34 and segment 44a is constrained against movement axially relative to the turret 34 and secures the clamping relation of three of the sets of elements 40 and 41, the remaining set of elements 40 and 41 is moved axially by segment 44b which is slidable axially relative to the turret 34 by a rod 45 the lower end of which is secured to a second slide 46, FIGURE 4B, which is slidable in fixed guides 47. The slide 46 carries rollers 48 which co-operate with a cam 49 keyed to the stationary shaft 26. The clamping elements 40, 41 seal the can body 1 by pressing against the flanges 3 of the body. The elements 40, 41, FIG. 7, are secured to the turret 34 and pad 42 by annular rings 40a, 41a made of steel or other electrically conducting material and are electrically insulated from the turret 34 and pad 42 by electrically insulating bushes 50, FIGURE 7. Two guide members 51 and 52, both of U-shape as shown in FIGURE 8, are provided to guide a can body 1 into and out of position for engagement by the clamping elements 40, 41. Screws 53, 54 respectively retain the parts 40, 50, 51 in position relative to the turret 34 and parts 41, 50, 52 in position relative to pad 42. As the turret moves a gripper means towards the position at which a can body is removed therefrom the cam 49, through rod 45 and segment 44b moves pad 42 away from the clamping element 40 thus releasing the can body so that the flanges 3 are engaged by the guide members 51, 52 to permit the body to be removed and a further can body to be inserted between the guide members at a loading position. Then as the turret moves the gripper means away from the loading position the cam 49 moves the pad 42 towards the clamping element 40 so that the said further can body is clamped between the elements 40, 41 for treatment. While the can body is being moved to and from the loading position the segment 44a retains the elements 40, 41 in the clamping positions thereof. Loading and unloading may be effected by any suitable means not shown.

When a can body is clamped between the elements 40, 41 the flanges 3 of the body are in electrical contact with conductive elements 40a, 41a and one of the elements 40a, 41a has a wire 55 connected thereto and which, in known manner, through slip rings, not shown, connects the body 1 electrically with the D.C. supply 19.

Figure 5:
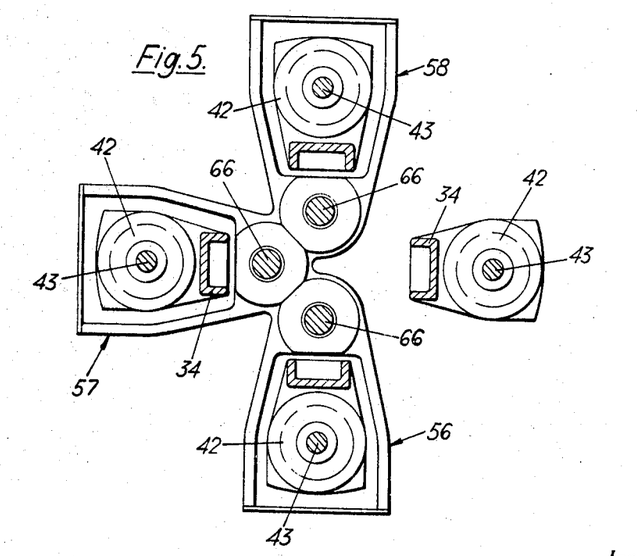
FIGURE 5 is a section on line V—V of FIGURE 4.
Figure 6:
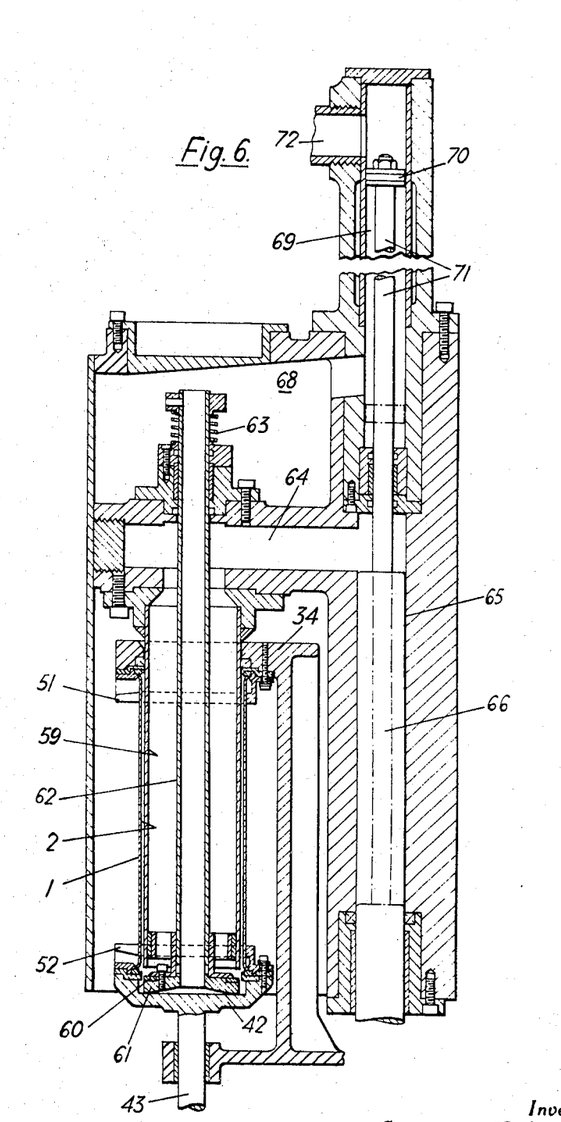
FIGURE 6 is a longitudinal section through one of three like housings carried by a turret supported by said arm.

Also supported by the arm 33 are three housings 56, 57, 58, FIGURE 5, all of like construction, one of the housings being illustrated in section in FIGURE 6. The housings 56, 57, 58 are spaced at 90° intervals about and at equal radii from the longitudinal axis of the arm 33 and with their open ends disposed in a plane tangential and parallel to the axis of shaft 26. The housing 56 acts as a cell in which electro-deposition is effected and in the housings 57, 58 washing subsequent to electro-deposition is effected.

Referring to FIGURE 6, the housing encloses a cylinder 59 which in the housing 56 acts as an electrode. The housing has an open end which is directed towards the axis of rotation of the arm 33 and faces the turret 34 and the end of the cylinder 59 which is adjacent to the open end of the housing is normally closed by a valve which consists of a sealing ring 60, of rubber or other suitable material, carried by a head 61 mounted at the end of an axially movable hollow stem 62. A spring 63 retains the sealing ring in the normal sealing position thereof. The end of the cylinder 59 nearest the spring 63 is an open end which is in communication with a first passage 64 which in turn is in communication with a second passage 65 which houses a plunger 66. The plunger 66 is carried by a plate 67, FIG. 4A, connected by a journal pin 68 with the turret 34. The plate 67 is accordingly movable axially with turret 34 and the turret 34 is rotatable relative to the plate 67. The cylinder 59 and passages 64, 65 associated with housing 56 are normally filled with electrolyte and passage 64 is in communication, through a non-return valve, not shown, with the storage tank 4 from which electrolyte is fed to the non-return valve by a pump, not shown. The housing also includes a chamber 68 which is in communication with the interior of the hollow stem 62 and with a third, or discharge passage 69 which in turn is in communication with the tank 4, and houses a piston 70 connected by a rod 71 for axial movement with the plunger 60. The cylinder 59 and passages 64, 65 associated respectively with the housings 57, 58 are normally filled with ionised water and, through non-return valves, not shown, the passages 64 thereof communicate respectively with the tank 13 and sump 22 and the passages 69 also respectively communicate with the tank 13 and sump 22 through pipes 72.

When the apparatus is in operation a can body 1 is clamped at the loading position between the clamping elements 40, 41 and the turret 34 is moved by cam 36 first away from the open end of the housing 56 and is then rotated from the loading position through 90° by the screw type cam 27 during which time the turret 34 remains in the retracted position and after which movement the turret is returned to locate the can body therein, as shown in FIGURE 6, so that the can body closely surrounds the cylinder 59. As the can body is moved about the cylinder 59 the plunger 66 moves towards passage 64 so compressing the electrolyte and forcing the sealing ring 60 away from the end of the cylinder so that electrolyte flows out of the interior of the cylinder into the space between the cylinder and the can body where it is centrifugally retained. When the can body is located relative to the cylinder 59 the sealing ring 60 is restored by spring 63 into sealing relation with the end of cylinder 59 and the time-controlled switching unit 9 operates to cause current to flow thereby to effect electro-deposition of lacquer on exposed metal areas of the can body which are in contact with the electrolyte, during which time the turret 34 remains in the forward position.

When electro-deposition has been effected the turret 34 is moved axially to withdraw the can body from housing 56. During this action the plunger 66 is also withdrawn and the pump body is refilled; and the electrolyte which fills the space between the can body and cylinder is centrifugally discharged through the hollow stem 62 into the chamber 68 and discharge passage 69 from whence it is returned to tank 4 by the piston 70 on the next forward stroke of plunger 66. After withdrawal of the treated can body from housing 56 the turret 34 is rotated through a further 90° and the treated body is inserted into housing 57 for a first washing with de-ionised water, then following withdrawal of the can body from housing 57 the turret 34 is rotated through a further 90° and the body is inserted into the housing 58 for the second washing with de-ionised water. It is to be understood that when the apparatus is in full operation there will at any given time during treatment be a can body in each of the housings 56, 57 and 58 and a further can body will be in the course of being clamped at the loading position. The can bodies when treated and released by the clamping elements can be delivered on to a run-way or the like from which they are removed and inserted into a heated oven in which the bodies are dried and electro-deposited polymer stoved.

In preferred embodiments of the invention the electrolyte is an aqueous emulsion and is a cationic emulsion, the electrode being an anode.

In a machine embodying ten sets of apparatus as just described the carriers formed by the arms 33 can be rotated at such a rate, and the movements of the turrets 34 so timed, that ten can bodies are processed every second thus providing for the processing of cans at the rate of 600 per minute. By increasing the number of carriers and apparatus associated therewith this output can be exceeded.

It will be understood that when using the apparatus to treat pre-coated can bodies, polymer is deposited only on those areas of the bodies from which the pre-coating of lacquer may have been damaged because due to the insulating properties of the pre-coating no polymer is electro-deposited on the adequately pre-coated areas of the bodies. Accordingly, as compared with the previously employed method of spray-coating the entire pre-coated interior surfaces of can bodies, the method according to the present invention results in a considerable saving of the relatively expensive coating material and at the rate of treatment equal to that of the rate of production of the can bodies.

Figures 9, 10:
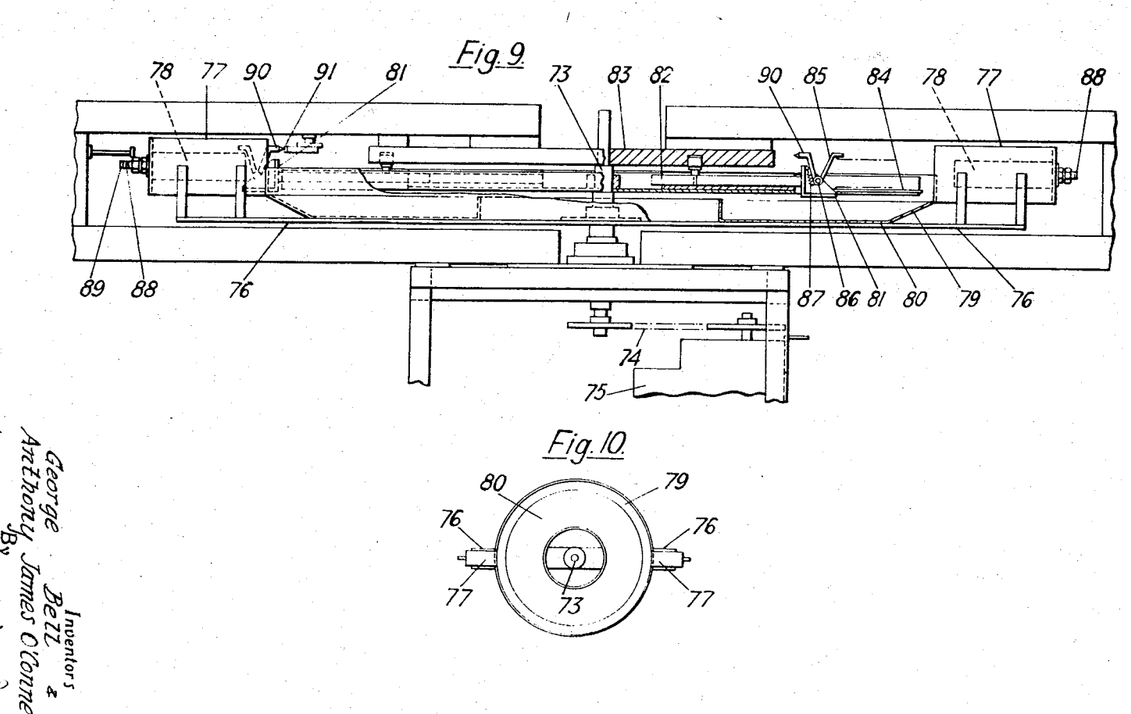

FIGURES 9 and 10 diagrammatically illustrate an alternative form of apparatus for effecting the electro-deposition of lacquer in cells which are rotatable about a vertical axis. In this embodiment of the invention the treated can bodies are not washed while held by the apparatus but are removed therefrom for washing or rinsing.

Referring to FIGURES 9 and 10, a vertical shaft 73 is rotatable continuously about its axis by a chain 74 driven by a motor 75. Secured to the shaft 73 for rotation therewith are two diametrically opposite arms 76 each supporting a cell 77 having an open end facing the shaft 73 and arranged in a vertical plane. Each cell 77 houses an electrode 78 and the open end of the cell is located at the upper end of a sloping side 79 of a circular trough 80 which is also rotatable with the shaft 73.

Aligned with each cell 77 is a carrier 81 supported by a slider 82 for movement towards and away from the cell by a stationary cam 83. The carrier 81 is provided with gripper means arranged to grip a can body 1 for movement by the carrier into and out of the cell. The gripper means comprises rails 84 and a finger 85 which is pivoted at 86 to the carrier 81 and which is urged to the can body gripping position thereof by a spring 87. The raw edge portion of a flange 3 of a can body 1 is gripped between the rails 84 and the finger 85. The cans are loaded and unloaded on to a carrier by any suitable means, not shown, and a guide rail, not shown, is arranged to co-operate with the finger 85 to move it against the action of spring 87 to permit unloading of a treated can body and to retain the finger in the "open" condition thereof until a can body to be located has been loaded on rails 84 for gripping by the finger 85.

Each electrode 78 is provided with a wiper 88 for co-operation with a stationary electrical contact 89 and each finger 85 has a tail piece 90 for co-operation with a stationary electrical contact 91.

Electrolyte is contained in the trough 80 and on rotation of the shaft 73 electrolyte is thrown centrifugally up the sloping side 79 into the cells 77 and is centrifugally retained in the cells. The carriages 81, under control of cam 82, move can bodies gripped thereby into and out of the cells and while the wipers 88 and tail pieces 85 are engaged with the contacts 89, 91 and the can bodies are located in the cells to surround the electrode the time-controlled switching unit 9 operates to cause current to flow thereby to effect electro-deposition of lacquer on exposed metal areas of the can body which are in contact with the electrolyte.

In the foregoing description the invention has been described with reference to the treatment of can bodies open at both ends thereof, it is to be understood, however, that the method and apparatus herein described can be employed for the treatment of can bodies one end of which is closed by a can end seamed thereto, or for the treatment of can ends which are to be seamed to can bodies. When the method is used for the treatment of such other components the apparatus will be modified in respect of the manner in which the components are gripped for movement thereof relative to the cells, for example the components will be gripped by suction devices ararnged to engage the exterior faces of the end components.

We claim:

1. Apparatus for electrodepositing a coating on electrically conductive surface areas of articles, said apparatus including cell means for locating one of said articles, an electrode within said cell means, means for mounting said one of said articles in close proximity to said electrode, means for introducing an electrolyte into said cell means, means for rotating said cell means about an axis of rotation lying outside said cell means for centrifugally retaining the electrolyte between said electrode and said one of said articles, and means for applying a potential between said one of said articles and said electrode to effect coating of electrically conductive surfaces by electrodeposition.

2. Apparatus according to claim 1 further comprising a plurality of said cell means mounted angularly displaced about said axis of rotation by said means for rotating.

3. Apparatus according to claim 1 further comprising means for moving articles into and out of said cell means during rotation of the articles and said cell means.

4. Apparatus according to claim 3 wherein said means for rotating includes arm means extending away from said axis of rotation toward said cell means, said cell means comprising means defining a first station supported by said arm means, said apparatus further including means defining at least one rinsing station supported by said arm means and angularly displaced about said arm means from said means defining a first station.

5. Apparatus according to claim 4 including means for moving said articles about said arm means from station to station during rotation about said axis of rotation.

6. Apparatus according to claim 1 wherein said means for introducing an electrolyte comprises means for containing a quantity of electrolyte and means communicating between said cell means and said means for containing and rotatable with said cell means for effecting movement of electrolyte to said cell means by centrifugal force.

7. Apparatus according to claim 6 wherein said axis of rotation is vertical, said means for containing a quantity of electrolyte being positioned intermediate said axis of rotation and said cell means, said means communicating between said cell means and said means for containing comprising ramp means intermediate said cell means and said means for containing, whereby electrolyte flows up said ramp means to said cell means upon rotation of said means for rotating.

8. Apparatus for electrodepositing a coating on exposed interior surfaces of tubular can bodies comprising electrode means for location within the interior of a can body to define a space between said electrode means and the can body, means for introducing electrolyte into said space, means mounting said electrode for rotation about an axis of rotation spaced therefrom to retain electrolyte in said space, and means for applying a potential between a can body and said electrode to effect electro-deposition on said exposed interior can surfaces during rotation of said electrode and a can body about said axis of rotation.

9. Apparatus according to claim 8 wherein said electrode extends away from said axis of rotation, said space between a can body and said electrode being annular and closed adjacent the end of said electrode farthest from said axis of rotation, whereby centrifugal force upon said electrolyte is toward the closed end of the space.

10. Apparatus according to claim 9 wherein said electrode defines a passage extending therethrough, said passage being part of said means for introducing electrolyte, and means extending through said passage for sealing said passage to prevent a flow of electrolyte from the space intermediate a can body and said electrode.

11. Apparatus according to claim 10 further comprising means for withdrawing electrolyte from between a can body and said electrode including further passage means defined by said means extending through said passage for allowing flow from the space between a can body and the electrode.

12. Apparatus for electrodepositing exposed conducting surface areas on can bodies comprising rotation means including a centrally mounted member having a plurality of arms extending radially outwardly away from a central axis or rotation, a plurality of work station defining means supported on each of said arms, one of said station defining means on each of said arms including electrode means and means for accommodating a can body in proximity to said electrode means for electro-deposition of coating material upon the can body, means for supporting can bodies on said arms including turret means for moving can bodies about said arms to each of the work stations on an associated arm.

13. Apparatus according to claim 12 wherein said electrode means comprises an electrode having an exterior surface for facing the interior of the can bodies, said apparatus further comprising means for sealing the interior of a can body when positioned over said electrode and means for admitting electrolyte into and removing electrolyte for the interior of a can body for retention therein by centrifugal force during rotation of said rotation means.

14. Apparatus according to claim 12 further comprising cam means fixed with respect to said axis of rotation for moving said turret means toward and away from said axis of rotation to move the can bodies into and out of cooperation with said work station refining means.

15. The method of electrodepositing a coating on electrically conducting surface areas of an article including the steps of providing an electrode, locating the article proximate the electrode, rotating the electrode and article about an axis spaced therefrom, introducing an electrolyte intermediate the article and electrode, maintaining the electrolyte between the article and the electrode by centrifugal force and applying a potential between the article and electrode to effect coating of the conductive article surfaces by electro-deposition.

16. The method according to claim 15 including providing a plurality of electrodes, locating articles proximate each electrode and rotating each article and associated electrode about the same axis of rotation.

17. The method according to claim 15 further including the steps of moving the article about a further axis extending away from the axis of rotation to at least one further position and washing the article at the at least one further position.

18. The method according to claim 16 wherein the step of introducing electrolyte comprises locating an electrolyte retainer intermediate the axis of rotation and the article and electrode, and providing movement of the electrolyte from the retainer to between the article and electrode by centrifugal force.

19. The method according to claim 18 wherein the step of rotating the article and electrode includes rotating the article and electrode about a vertical axis of rotation and said step of providing movement of electrolyte comprises locating an inclined member intermediate the retainer and the article and electrode and causing a flow of electrolyte up the inclined member to between the article and electrode by centrifugal force upon rotation about the vertical axis.

20. The method according to claim 15 further including the step of rinsing the article in deionized water after the electro-deposition of coating material thereon.

21. The method according to claim 20 wherein the step of rinsing includes rinsing the article first in cold deionized water then rinsing the article in hot deionized water to improve coagulation of the deposited material.

22. The method according to claim 20 wherein the step of rinsing occurs during rotation of the article.

23. The method of coating exposed interior surfaces of can bodies including the steps of providing an electrode, moving a can body axially into surrounding relation with the electrode to define a space therebetween, clamping and sealing each end of the can body, rotating the can body and electrode about an axis of rotation, introducing electrolyte into the can body and applying a potential between the electrode and can body during rotation thereof to coat exposed surfaces of the can body by electro-deposition.

24. The method according to claim 23 further including the step of rinsing the can body during rotation thereof.

25. The method according to claim 23 wherein the step of introducing electrolyte includes providing a passage through the electrode and passing the electrolyte therethrough to the interior of the can body.

26. The method according to claim 25 further including providing a further passage extending through the first mentioned passage and removing electrolyte through the further passage.

27. The method of applying coating material to exposed surfaces of can bodies including providing an electrode, moving a can body longitudinally into surrounding relation to the electrode to define a space therebetween, rotating the can body and electrode about an axis spaced therefrom, introducing an electrolyte into the space between the can body and electrode, retaining electrolyte in the space by centrifugal force and applying a potential between the can body and electrode during rotation thereof to effect coating of the can body by electro-deposition.

References Cited

UNITED STATES PATENTS

| | | | |
|---|---|---|---|
| 680,408 | 8/1901 | Cowper-Coles | 204—212 |
| 2,185,089 | 12/1939 | Kronquest | 118—52 |
| 2,215,145 | 9/1940 | Clayton et al. | 204—181 |
| 2,215,166 | 9/1940 | Sumner et al. | 204—300 |
| 2,800,448 | 7/1957 | Fredenburgh | 204—300 |
| 3,024,184 | 3/1962 | Bowes et al. | 204—300 |
| 3,238,115 | 3/1966 | Pedersen | 204—300 |

FOREIGN PATENTS

| | | |
|---|---|---|
| 486,473 | 9/1952 | Canada. |
| 101,919 | 7/1936 | Great Britain. |
| 201,907 | 12/1923 | Great Britain. |

JOHN H. MACK, Primary Examiner

E. ZAGARELLA, JR., Assistant Examiner

U.S. Cl. X.R.

118—52; 204—212, 299, 300